(12) United States Patent
Park et al.

(10) Patent No.: US 10,817,624 B2
(45) Date of Patent: Oct. 27, 2020

(54) MEMORY SYSTEM AND STORAGE DEVICE CAPABLE OF PERMANENTLY DELETING DATA STORED IN A NON-VOLATILE MEMORY

(71) Applicant: SAMSUNG ELECTRONICS CO., LTD., Suwon-si, Gyeonggi-do (KR)

(72) Inventors: Jin-Hwan Park, Yongin-si (KR); Kyung Ho Kim, Seoul (KR); Min-Chul Kim, Suwon-si (KR); Sagar Uttarwar, Suwon-si (KR); Yong Gil Song, Hwaseong-si (KR); Min Gon Shin, Uiwang-si (KR); Sun-Mi Yoo, Seoul (KR); Hyun Su Jang, Suwon-si (KR); Seung Yeun Jeong, Anseong-si (KR); Ki Hyun Choi, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 266 days.

(21) Appl. No.: 15/975,008

(22) Filed: May 9, 2018

(65) Prior Publication Data

US 2019/0130135 A1 May 2, 2019

(30) Foreign Application Priority Data

Oct. 31, 2017 (KR) .......................... 10-2017-0143420

(51) Int. Cl.
*G06F 21/79* (2013.01)
*G06F 3/06* (2006.01)
(Continued)

(52) U.S. Cl.
CPC .............. *G06F 21/79* (2013.01); *G06F 3/064* (2013.01); *G06F 3/0604* (2013.01);
(Continued)

(58) Field of Classification Search
CPC .......... G06F 21/79; G06F 21/85; G06F 12/14; G06F 3/0652; G06F 12/0246;
(Continued)

(56) References Cited

U.S. PATENT DOCUMENTS 8,261,136 B2    9/2012  D'Abreu et al.
8,909,888 B2 *  12/2014 Goss ....................... G06F 12/00
                                                            711/166
(Continued)

FOREIGN PATENT DOCUMENTS

KR    20120100705 A    9/2012
KR    1392174          5/2014
(Continued)

OTHER PUBLICATIONS

Hiep, Nguyen-Van, and Jen-Wei Hsieh. "Tinnestannp-based hot/cold data identification scheme for solid state drives." Proceedings of the 2018 Conference on Research in Adaptive and Convergent Systems. 2018. (Year: 2018).*

*Primary Examiner* — Francisco A Grullon
(74) *Attorney, Agent, or Firm* — Volentine, Whitt & Francos, PLLC

(57) ABSTRACT

A storage device includes a non-volatile memory including a first block, a second block and a block management area that stores an initial data write time and a final data write time for each of the first block and the second block. The storage device also includes a memory controller that determines a creation time and a modification time for first data in response to a permanently delete command identifying the first data, selects at least one of the first block and the second block to be permanently deleted by comparing the initial data write time and the final data write time for each of the first block and the second block with the creation time (Continued)

and the modification time, and permanently deletes the selected at least one of the first block and the second block.

18 Claims, 11 Drawing Sheets

(51) Int. Cl.
 *G06F 12/02* (2006.01)
 *G06F 21/85* (2013.01)
 *G06F 12/14* (2006.01)

(52) U.S. Cl.
 CPC ........ *G06F 3/0652* (2013.01); *G06F 12/0246* (2013.01); *G06F 12/14* (2013.01); *G06F 21/85* (2013.01); *G06F 2212/7205* (2013.01); *G06F 2221/2143* (2013.01)

(58) Field of Classification Search
 CPC .............. G06F 3/0604; G06F 3/064; G06F 2212/7205; G06F 2221/2143; G06F 2212/7207; G06F 3/0608; G06F 3/0679
 See application file for complete search history.

(56) References Cited

U.S. PATENT DOCUMENTS

| | | | |
|---|---|---|---|
| 9,110,909 B2 | 8/2015 | Sutoh et al. | |
| 9,218,348 B2 | 12/2015 | Roach et al. | |
| 9,317,422 B1* | 4/2016 | Winters | ................. G11C 16/22 |
| 9,442,955 B1 | 9/2016 | Pawar et al. | |
| 9,632,949 B2 | 4/2017 | Hasegawa et al. | |
| 2012/0110343 A1* | 5/2012 | Bandic | .................... G06F 21/80 |
| | | | 713/189 |
| 2012/0198130 A1* | 8/2012 | Noborikawa | ......... G06F 3/0616 |
| | | | 711/103 |
| 2012/0260038 A1* | 10/2012 | Imazaki | ................ G06F 3/0608 |
| | | | 711/114 |
| 2012/0278564 A1* | 11/2012 | Goss | ................... G06F 12/0253 |
| | | | 711/155 |
| 2015/0046394 A1 | 2/2015 | Onda et al. | |
| 2016/0041884 A1 | 2/2016 | Iwasaki et al. | |
| 2019/0317688 A1* | 10/2019 | Cheon | ................... G06F 3/0652 |

FOREIGN PATENT DOCUMENTS

| | | |
|---|---|---|
| KR | 1539617 B1 | 8/2015 |
| WO | WO2011-002657 A1 | 1/2011 |

* cited by examiner

| BLOCK | OLDEST | LATEST |
|-------|--------|--------|
| 1 | 100 | 200 |
| 2 | 90 | 400 |
| 3 | 20 | 30 |
| 4 | 400 | 500 |
| 5 | 110 | 130 |
| 6 | 200 | 500 |

FIG. 11
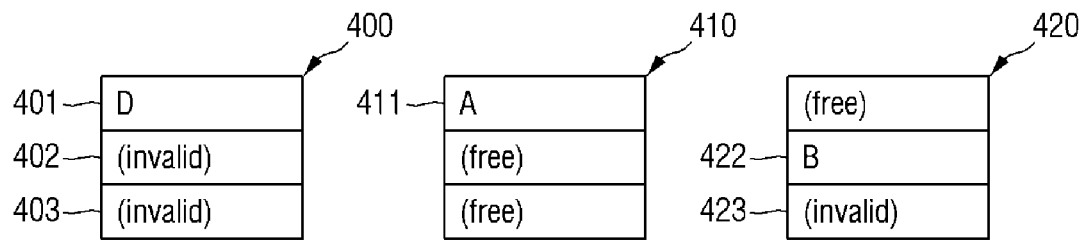
FIG. 12
| BLOCK | OLDEST | LATEST |
|---|---|---|
| 1 | 40 | 200 |
| 2 | 300 | 300 |
| 3 | 20 | 30 |
FIG. 13
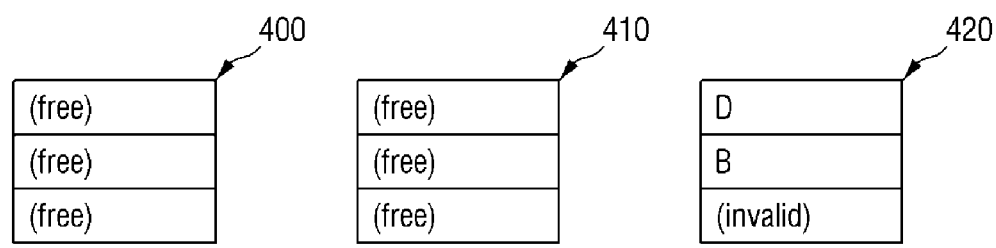

MEMORY SYSTEM AND STORAGE DEVICE CAPABLE OF PERMANENTLY DELETING DATA STORED IN A NON-VOLATILE MEMORY

CROSS-REFERENCE TO RELATED APPLICATION

This application claims priority under 35 U.S.C. 119 from Korean Patent Application No. 10-2017-0143420 filed on Oct. 31, 2017 in the Korean Intellectual Property Office, the subject matter of is hereby incorporated by reference.

BACKGROUND

1. Technical Field

The present disclosure relates to a memory systems, storage devices capable of being incorporated in memory systems, and memory systems and storage devices capable of permanently deleting data stored in a non-volatile memory of the storage device.

2. Description of the Related Art

Flash memory, as one particular form of non-volatile memory, is widely used in computers, memory cards and the like because it is capable of electrically and collectively erasing stored data. As the use of portable information devices such as mobile phones and digital cameras has increased, flash memory has been widely used as a storage device essentially replacing hard disk drives. The mobile devices gradually require a large-capacity storage device in order to provide various functions (e.g., video playback, high-quality music playback, etc.).

Flash memory is one type of non-volatile memory and as such is preferred in many applications because it is capable of retaining stored data in the absence of applied power. However, data deleted using software may nonetheless be physically retained in a flash memory. This may pose a security risk. Therefore, there is a need to completely or permanently delete data that has previously been stored in a non-volatile memory but now should be deleted.

SUMMARY

Certain embodiments of the inventive concept provide method whereby data stored in a non-volatile memory (e.g., flash memory) may be rapidly and effectively deleted in a secure, permanent manner.

In one embodiment the inventive concept provides a storage device including; a non-volatile memory including a first block, a second block and a block management area that stores an initial data write time and a final data write time for each of the first block and the second block, and a memory controller that determines a creation time and a modification time for first data in response to a permanently delete command identifying the first data, selects at least one of the first block and the second block to be permanently deleted by comparing the initial data write time and the final data write time for each of the first block and the second block with the creation time and the modification time, and permanently deletes the selected at least one of the first block and the second block.

In another embodiment the inventive concept provides a storage device including; a non-volatile memory including a plurality of blocks, including a first block and a block management area that stores an initial data write time and a final data write time for each one of the plurality of blocks, and a controller, wherein the controller updates at least one of an initial data write time and a final data write time for the first block stored in the block management area upon receiving a command to write data to a page of the first block or upon writing the data to the page of the first block in response to the command.

In another embodiment the inventive concept provides a memory system including; a storage device including a device timer that generates device time associated with the storage device and a controller, a processor including a system timer that generates memory system time associated with the memory system, and a volatile memory that stores a difference value between the device time and the memory system time, wherein the processor receives the device time from the device timer when the memory system is turned ON or the memory system time is changed, calculates a difference value between the memory system time and the device time and stores the difference value in the volatile memory, calculates the device time based on the difference value when creating or modifying first data, and stores the device time as a creation time or a modification time of the first data in meta information of the first data.

BRIEF DESCRIPTION OF THE DRAWINGS

The above and other aspects and features of the present disclosure will become more apparent by describing in detail embodiments thereof with reference to the attached drawings, in which:

FIGS. 11, 12, 13 and 14 are diagrams explaining another example of a method of performing permanent deletion in a storage device according to some embodiments.

DETAILED DESCRIPTION

Figure 1:
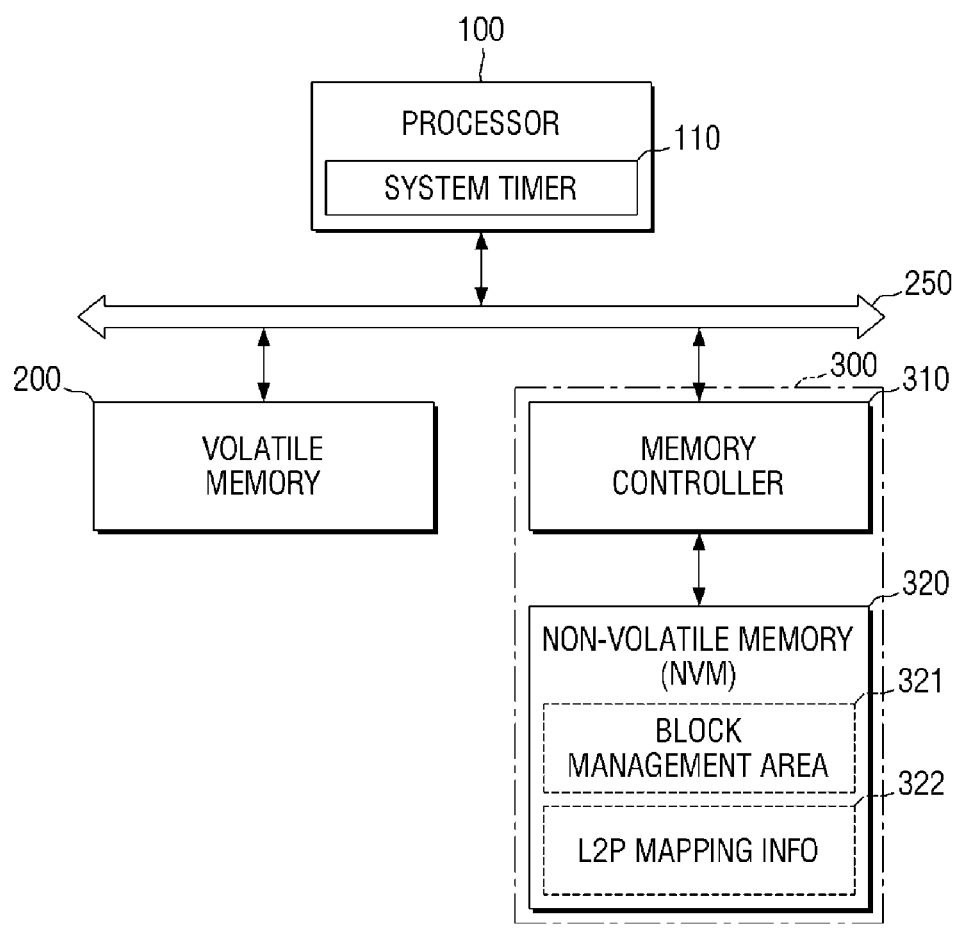
FIG. 1 is a block diagram illustrating an example of a memory system according to some embodiments.

FIG. 1 is a block diagram illustrating a memory system 1 according to an embodiment of the inventive concept. The memory system 1 generally comprises a processor 100, a volatile memory 200, a storage device 300 and a bus 250.

The memory system 1 may be implemented as one of a TV, a digital TV (DTV), an internet protocol TV (IPTV), a personal computer (PC), a desktop computer, a lap-top computer, a computer workstation, a tablet PC, a video game platform (or video game console), a server and a mobile computing device. Here, the mobile computing device may be implemented as a mobile phone, a smart phone, an enterprise digital assistant (EDA), a digital still camera, a digital video camera, a portable multimedia player (PMP), a personal navigation device or portable navigation device (PND), a mobile internet device (MID), a wearable computer, an Internet of Things (IOT) device, an Internet of Everything (IOE) device or an e-book.

Within the memory system 1 of FIG. 1, the processor 100, volatile memory 200 and storage device 300 are configured to respectively and selectively exchange data using the bus 250.

The bus 250 may be implemented using one or more specification(s) such as those described by for the Peripheral Component Interconnect (PCI) bus, PCI Express (PCIe) bus, Advanced Microcontroller Bus Architecture (AMBA), Advanced High Performance Bus (AHB), Advanced Peripheral Bus (APB), Advanced Extensible Interface (AXI), for example.

The processor 100 may be implemented to control the overall operation of the memory system 1, including various operations performed by the memory system 1 to read (retrieve), write (store) and/or erase (delete) data from one or more constituent memories. In this regard, the the processor 100 may control the execution (of "drive") one or more operating system(s) (OS), application(s) and/or a database manager(s) operative with respect to the memory system 1.

The processor 100 may be a central processing unit (CPU), a co-processor, an arithmetic processing unit (APU), a graphic processing unit (GPU), a digital signal processor (DSP) or the like.

In the illustrated embodiment of FIG. 1, the processor 100 comprises a system timer 110 configured to generate and/or maintain one or more system time(s), including (e.g.,) a window time. The system timer 110 may be implemented in hardware and/or software, and may in certain embodiments be changed by the user.

The storage device 300 of FIG. 1 comprises a memory controller 310 and a non-volatile memory 320. Thus, the processor 100 may communicate with the memory controller 310 included in the storage device 300 to read data stored in the non-volatile memory 320, write data to the non-volatile memory 320, and/or erase data stored in the non-volatile memory 320.

The non-volatile memory 320 is able to coherently retain stored data even in the absence of applied power. In this regard, the non-volatile memory 320 may be implemented using NAND flash memory. And as will be appreciated by those skilled in the art, NAND flash memory typically performs data write and read operations on a page basis, while performing data erase operations on a block basis, where each block includes a plurality of pages.

Recognizing the performance characteristics of NAND flash memory, when data designated by a corresponding address and stored in the non-volatile memory 320 is changed, the processor 100 may erase the block in which the data is stored and then (re-)write the erased block including the changed data. And further due to the characteristics of the non-volatile memory 320, the processor 100 must indirectly communicate with the non-volatile memory 320 through memory controller 310.

Since an erase operation performed in the non-volatile memory 320 requires a relatively long execution time, the memory controller 310 included in the storage device 300 may write (or program) new data to be changed in a temporary memory space (e.g., another block of non-volatile memory 320 not currently being used to store valid data) of the non-volatile memory 320 instead of erasing the block in which the changed data is to be stored, and thereafter storing an address identifying the temporary memory space.

It should be further noted that a first address (e.g., a logical address) recognized by the processor 100 for the data and a second address (e.g., a physical address) identifying the data stored in the non-volatile memory 320 may be different from one another. Accordingly, the memory controller 310 may manage "mapping information" indicating a relationship between a logical address and a corresponding physical address for respective data. For example, the memory controller 310 may store logical-to-physical address mapping information (i.e., "L2P mapping info", or more simply, "mapping info") 322 associated with the non-volatile memory 320.

Assuming this approach is used, a logical address is an address for data recognized by the processor 100, whereby the processor 100 may request the reading, writing or deleting of the data by specifying the logical address, instead of the corresponding physical address actually used by the non-volatile memory 320 to store the data. The physical address is an address directly associated with a memory location at which the data is stored in the non-volatile memory 320. Hence, the memory controller 310 may receive an access command from the processor 100 via the bus 250 including a logical address for designated data, and in response to the command and address perform a read, write or erase operation on the data in the memory space of the non-volatile memory 320 using the physical address corresponding to the logical address.

The memory controller 310 may receive various commands from the processor 100 and perform necessary operation(s) on the non-volatile memory 320 in response thereto. For example, the processor 100 may transmit a logical address for data to the storage device 300, and the memory controller 310 of the storage device 300 may respond to a command of the processor 100 by extracting a physical address corresponding to the logical address in accordance with the mapping info 322 and writing or reading the data at a memory location specified by the physical address.

The non-volatile memory may be implemented as an electrically erasable programmable read-only memory (EEPROM), a flash memory, a magnetic RAM (MRAM), a spin-transfer torque MRAM, a ferroelectric RAM (FeRAM), a phase change RAM (PRAM) or a resistive RAM (RRAM).

The volatile memory 200 may store a difference value between a "device time" associated with the storage device 300 and a "system time" recognized or maintained by the system timer 110 of the processor 100. For example, when the memory system 1 is turned ON, the processor 100 may calculate a difference value between the device time associated with a device time and memory system time, and store the calculated difference value in the volatile memory 200. Thereafter, the calculated difference value may be stored in the non-volatile memory 320. Here, the volatile memory 200 may be a random access memory (RAM), a static RAM (SRAM), a dynamic RAM (DRAM), a synchronous DRAM (SDRAM), a thyristor RAM (T-RAM), a zero capacitor RAM (Z-RAM), a Twin Transistor RAM (TTRAM), or various combinations thereof.

In a block management area 321 established in the non-volatile memory 320, an initial data write time and a final data write time may be stored for each of the plurality of blocks included in the non-volatile memory 320 (here, assuming a NAND flash memory implementation example for the non-volatile memory 320). The initial data write time is an earliest time at which data was written to the block, and the final data write time is a latest time at which the data was written to the block.

In this regard, the block management area 321 may be a distinct block of memory in the non-volatile memory 320 separate from other blocks in which data may be written to and/or read from.

Figure 2:
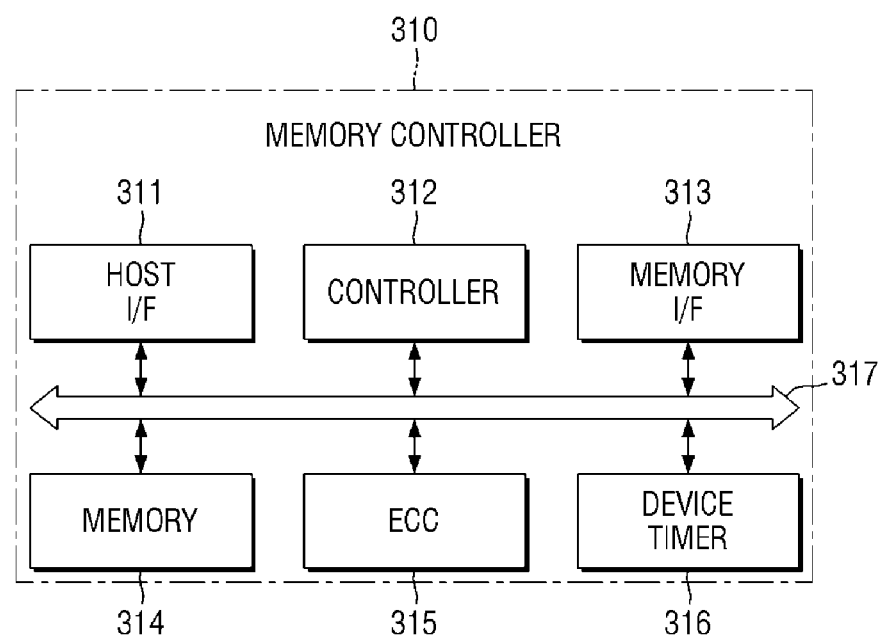
FIG. 2 is a block diagram illustrating an example of a memory controller according to some embodiments.

FIG. 2 is a block diagram further illustrating in one example the memory controller 310 of FIG. 1.

Referring to FIGS. 1 and 2, the memory controller 310 may control the execution of read, write, and erase operations and the like for the non-volatile memory 320 in response to request(s) received from the processor 100.

The memory controller 310 illustrated in FIG. 1 comprises a host interface 311, a controller 312, a memory interface 313, a memory 314, an Error Correcting Code (ECC) circuit 315, a device timer 316 and a bus 317, where the host interface 311, controller 312, memory interface 313, memory 314 and ECC circuit 315 are configured to exchange data with each other via the bus 317.

The memory controller 310 may exchange data and/or associated information with a host (e.g., the processor 100 of FIG. 1) via the host interface 311 and/or the non-volatile memory 320 via the memory interface 313. The host interface 311 may be connected to the host through a parallel AT attachment bus (PATA bus), a serial AT attachment bus (SATA bus), SCSI, USB, PCIe, or the like.

The controller 312 may be used to control the overall operation (e.g., read, write, erase, file data management, multiple block management, etc.) for the non-volatile memory 320. The controller 312 may include a central processing unit (CPU), a processor and the like.

In the illustrated embodiment of FIG. 2, it is assumed that the memory 314 operates under the control of the controller 312 and may be used as a working memory, a buffer memory, a cache memory or the like. When the memory 314 is used as a working memory, the data processed by the controller 312 may be temporarily stored in the memory 314. When the memory 314 is used as a buffer memory, the memory 314 may be used to buffer data being transferred between the host (e.g., the processor 1001) and the non-volatile memory 320. When the memory 314 is used as a cache memory, the relatively low-speed, non-volatile memory 320 may effectively be operated at a high speed.

The ECC circuit 315 may be used to identify (or detect) one or more fail bit(s) in read/write data received from the non-volatile memory 320 and/or generate an error correction code (ECC) that may subsequently be used to correct the fail bit(s). In addition, the ECC circuit 315 may be used to perform certain error correction decoding (e.g.,) on read retrieved from the non-volatile memory 320. For example, the ECC circuit 315 may be used to correct an error using coded modulation such as low density parity check (LDPC) code, BCH code, turbo code, Reed-Solomon code, convolution code, recursive systematic code (RSC), trellis-coded modulation (TCM), and block coded modulation (BCM).

And referring to FIGS. 1 and 2, the device timer 316 may be used to generate (e.g., count) one or more device time(s) associated with the storage device 300. As one example, the device timer 316 may be used to count a device time by counting a number of rising edges and/or falling edges of the clock applied to the storage device 300. As another example, the device timer 316 may generate a device time by counting a number of transitions of a clock applied to the storage device 300. However specifically generated, the device time may be communicated (e.g., transmitted) from the device timer to a host (e.g., processor 100).

Upon receiving a write command from the processor 100, for example, or when writing data to a page included in a block in response to a write command, information associated with a current device time generated by the device timer 316 may also be transmitted to the host. Here, the term "current" is used to further specify a particular device time associated with (e.g.,) a command, execution of the command, an operation responsive to the command, or provision of data in relation to a command or operation.

So, when receiving a particular command (e.g., a command to transmit the device time) from the processor 100, the controller 312 may be transmit information corresponding to a current device time generated by the device timer 316. Further, upon receiving a write command from the processor 100, or upon writing data to a page included in a block based on the received write command, the controller 312 may update an initial data write time or a final data write time for each of the plurality of blocks included in the non-volatile memory 320. This "update" of the initial data write time and/or the final data write time for each of the plurality of blocks included in the non-volatile memory 320 may be directly performed using the current device time generated by the device timer 316.

Thus, the initial data write time and/or the final data write time for each block may be defined in accordance with device time. This is advantageous since device time cannot be arbitrarily altered (e.g., by a user) unlike the memory system time associated with a memory system OS, for example.

When deleted data stored in the non-volatile memory 320, the controller 312 may simply delete corresponding mapping info 322. In this case, there is a problem that data desired to be permanently deleted nonetheless remains stored at the physical address of the non-volatile memory 320 despite having been "deleted" using the foregoing approach. Accordingly, the data thought to be deleted may be recovered in the future.

In view of the potential problem, certain methods of operating a memory system and/or memory device are presented hereafter that permanently and quickly delete data. Examples embodiments are described hereafter with reference to FIGS. 3, 4, 5, 6, 7, 8, 9, 10, 11 and 12.

Figure 3:
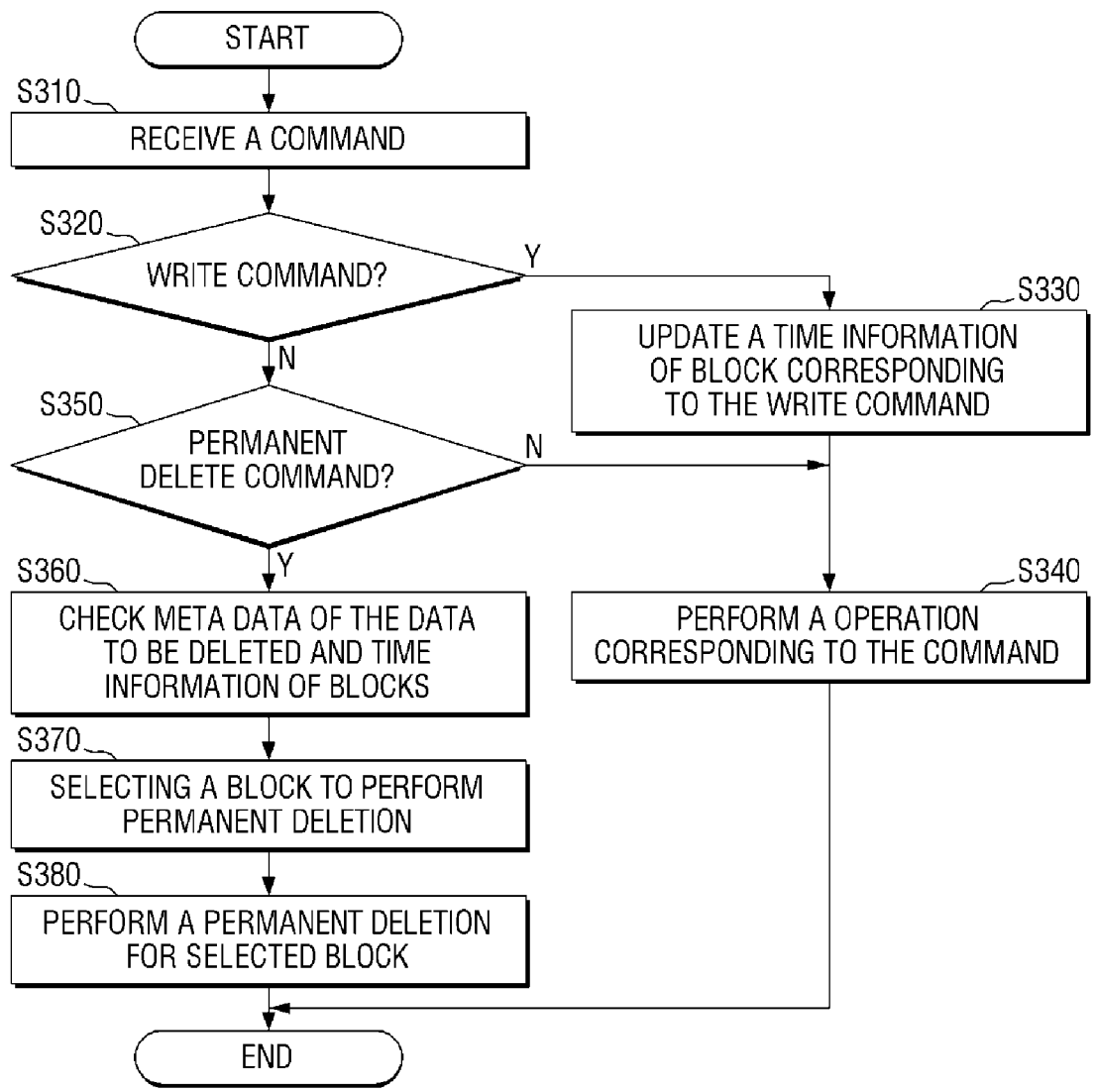
FIG. 3 is a flowchart illustrating an example of a method of permanently deleting data in a memory system according to some embodiments.
Figure 4:
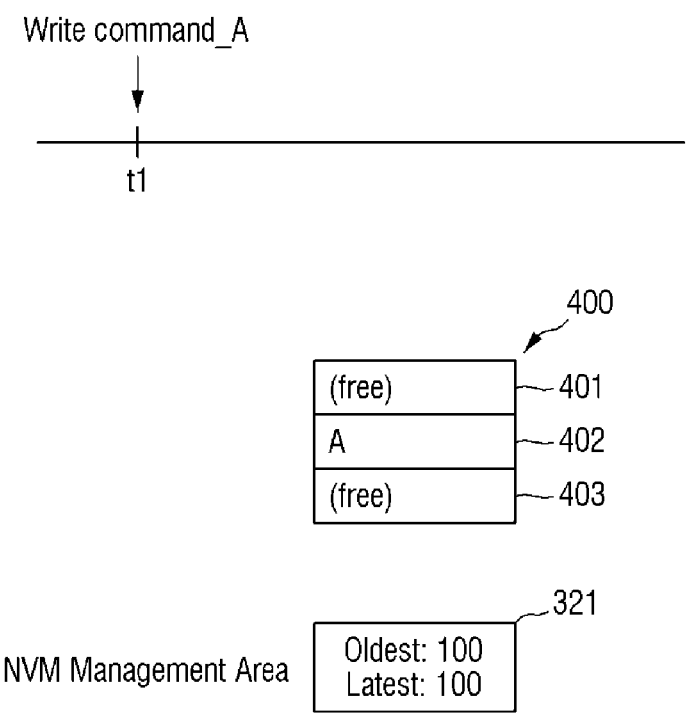
FIG. 4 is a diagram explaining an example of a method of updating an initial data write time and a last data write time for each of a plurality of blocks included in a non-volatile memory according to some embodiments.
Figure 5:
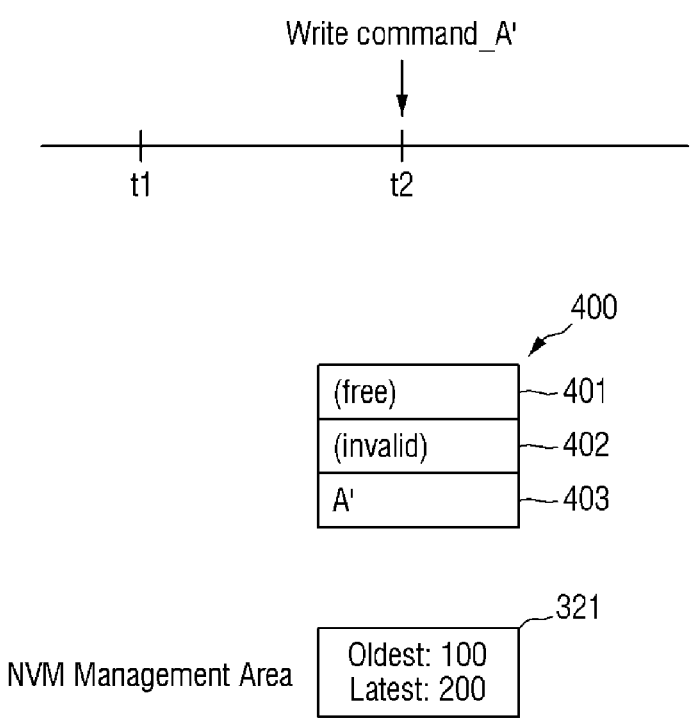
FIG. 5 is a diagram explaining an example of a method of updating an initial data write time and a last data write time for each of a plurality of blocks included in a non-volatile memory according to some embodiments.
Figure 6:
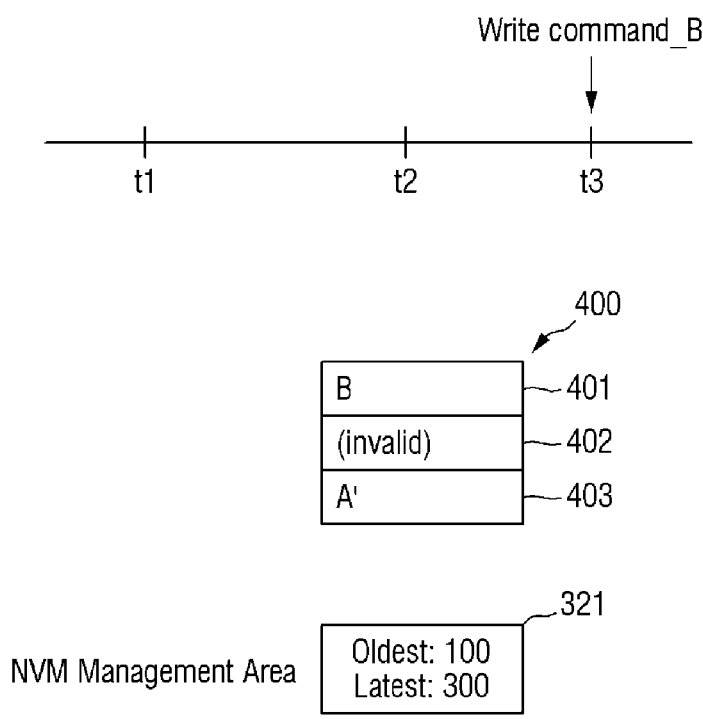
FIG. 6 is a diagram explaining an example of a method of updating an initial data write time and a last data write time for each of a plurality of blocks included in a non-volatile memory according to some embodiments.
Figure 7:
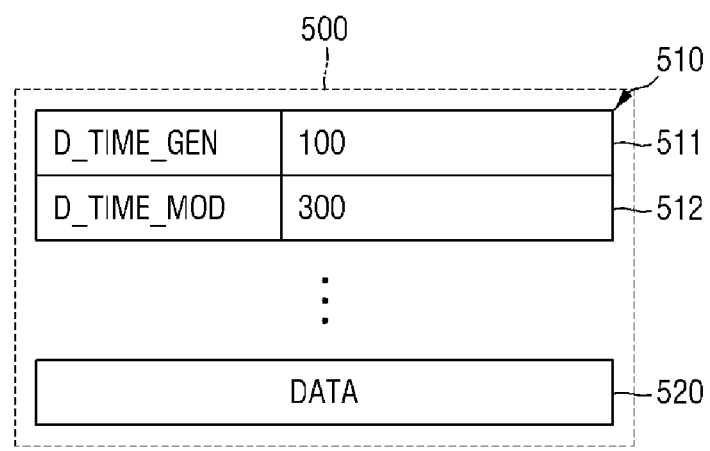
FIG. 7 is a diagram explaining an example of a method of storing a creation time and a modification time of data according to some embodiments.
Figure 8:
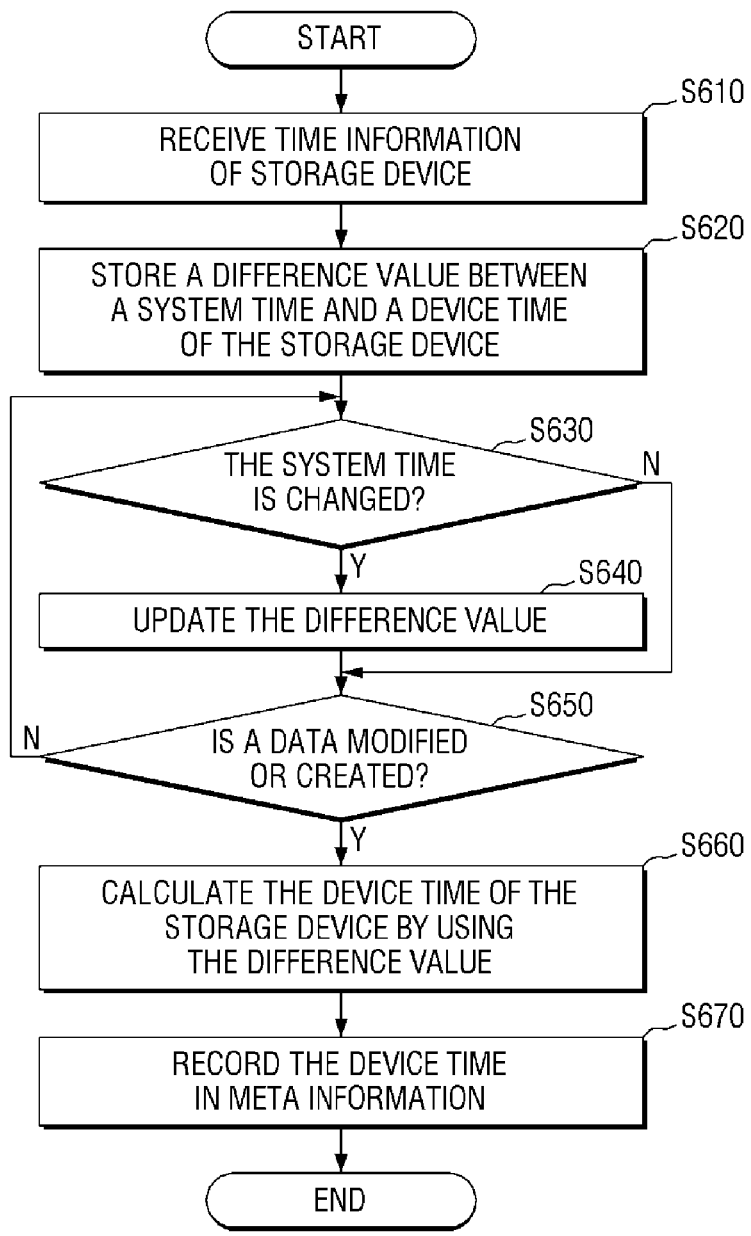
FIG. 8 is a diagram explaining an example of a method of storing a creation time and a modification time of data as meta information according to some embodiments.
Figures 9, 10:
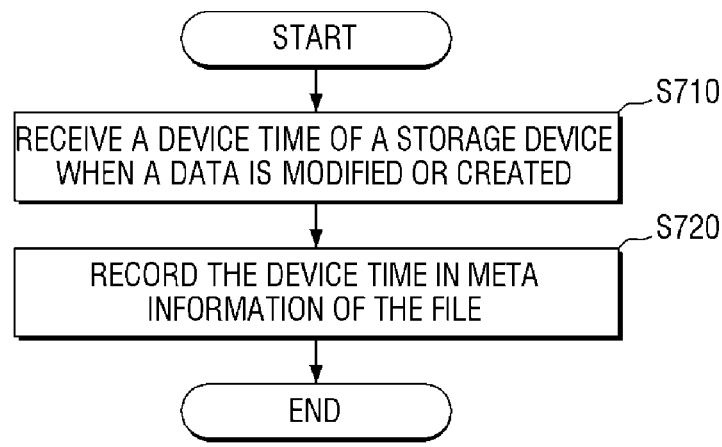
FIG. 9 is a diagram explaining an example of a method of storing a creation time and a modification time of data as meta information according to some embodiments.
FIG. 10 is a diagram explaining an example of a method of performing permanent deletion in a storage device according to some embodiments.

FIG. 3 is a flowchart summarizing one example of an operating method capable of permanently deleting data from a memory system according to embodiments of the inventive concept. In this regard, the term "permanently deleted" refers to an operating method approach and corresponding results wherein data previously stored in a non-volatile memory is physically altered such that is cannot subsequently be read from non-volatile memory. Thus, unlike conventional approaches that merely "de-list" or "de-reference" a physical memory location (or a logical/physical address relationship), embodiments of the inventive concept physically remove the identified data in a permanent manner. FIGS. 4, 5 and 6 are conceptual diagrams further illustrating an example of a method of updating an initial data write time and a final data write time for blocks included in the non-volatile memory according to certain embodiments of the inventive concept. FIG. 7 is a block diagram further illustrating an example of a method of storing a creation time and a modification time of data according to certain embodiments. FIGS. 8 and 9 are flowcharts further summarizing an example of a method of storing a creation time and a modification time of data as meta information according to certain embodiments.

Referring to FIGS. 1, 2 and 3, the controller 312 included in the memory controller 310 is assumed to receive a command from the processor 100 (S310). In response, the controller 312 determines whether the received command includes a write command (S320). If yes (320=Y), the controller 312 updates the time information (e.g., an initial data write time and/or a final data write time) for a block identified by the write command using the block management area 321 (S330). Then, the controller 312 performs one or more operation(s) corresponding to the write command (S340).

For example, referring now to FIG. 4 in the context of the foregoing, the processor 100 may transmit a write command for first data A to the controller 312 when creating the first data A at a first time t1. The controller 312, upon receiving the write command for the first data A, may write the first data A to a page (e.g., a second page 402) included in one (e.g., the first block 400) of a plurality of blocks included in the non-volatile memory 320. Here, the first page 401 and the third page 403 in the first block 400 may be free pages (e.g., pages not storing valid data).

When the first data A is written to the second page 402 included in the first block 400, the controller 312 may update the initial data write time and the final data write time for the first block 400. Here, the initial data write time and the final data write time may be stored as the device time generated by the device timer 316.

For example, when the first data A is written to the second page 402 of the first block 400 assuming a device time of "100", the controller 312 may update the block management area 321 of the first block 400 with information that the initial data write time and the final data write time are both "100". Here, since the first data A is first written to the first block 400, information of "100" may be stored as the initial data write time and the final data write time.

Continuing with the example described above and referring now to FIG. 5, when the first data A is changed to second data A' at a second time t2 following the first time t1, the processor 100 may delete mapping information for the logical and physical addresses associated with first data A, and transmit a command to write the second data A' to the controller 312. When receiving the command, the controller 312 may delete the mapping information between the physical address of the second page 402 and the logical address of the first data A, and thereby invalidate the second page 402. It should be noted at this point that despite the fact that the second page 402 has been invalidated, the initial data write time and the final data write time stored in the block management area 321 remain as written.

The controller 312 also receives a command to write the second data A', the controller 312 may write the second data A' to another page (e.g., a third page 403 of the first block 400). When the second data A' is written to the third page 403 included in the first block 400, the controller 312 may update the final data write time for the first block 400. Here, the final data write time may be the device time generated by the device timer 316.

For example, when the second data A' is written to the third page 403 of the first block 400 when the device time is "200", the controller 312 may update the block management area 321 with information that the final data write time is "200". In this case, since the initial data write time was "100" and only the final data write time is changed or updated to "200" with the initial data write time remaining at 100.

Referring now to the foregoing and FIG. 6, the processor 100 may transmit a write command for third data B to the controller 312 when creating the third data B different from the first data A and the second data A' at a third time t3 after the first time t1 and the second time t2.

The controller 312, when receiving a write command for the third data B, may write the third data B to a page included in any one of a plurality of blocks included in the non-volatile memory 320. For example, the controller 312 may write the third data B to the first page 401 included in the first block 400.

In this case, the final data write time for the first block 400 may be updated to the block management area 321 to "300" using the current device time. Since the initial data write time was "100" and only the final data write time has been changed, only the final data write time may be updated to "300" with the initial data write time remaining at "100" based on the actually written time, rather than time of data.

Referring back to FIG. 3, the controller 312 may determine whether the received command is a permanently delete command (S350) upon previously determining that the received command is not a write command (S320=N).

If the received command is not a permanently delete command (S350=N), the controller 312 may perform an operation corresponding to the command (S340).

As one example, when the received command is a read command, data corresponding to the command may be transmitted to the processor 100.

As another example, the controller 312 may perform an erase operation corresponding to the command when the received command is an erase command. However, even if the erase operation is performed, the data corresponding to the command is stored in the physical address, and only the mapping of the physical address and the logical address is deleted from the mapping info 322.

However, if the received command is a permanently delete command (S350=Y), the controller 312 may determine meta information for the data to be deleted as well as associated time information (e.g., the initial data write time and the final data write time) of each of the plurality of blocks (S360). Here, the meta information for the data to be deleted may stored (or updated) at the creation time and/or modification time for the data.

As one example, referring to FIG. 7, a file 500 stored in the non-volatile memory 320 may include meta information 510 and data 520. Here, the meta information 510 may include a creation time 511 and a modification time 512 for the data 520. The creation time 511 and the modification time 512 for the data 520 may be stored as device time for the storage device 300 as generated by the device timer 316.

The modification time 512 included in the meta information 510 may include only the final modification time 512 for the data 520. Accordingly, the amount of information stored in the meta information 510 may be minimized.

According to some embodiments, the processor 100 may calculate the data creation time or the data modification time as device time using a difference value between the memory system time and device time when creating or modifying data, and thereafter store it as meta information. This approach will be described in some additional detail with reference to FIG. 8.

Referring to FIGS. 1, 2 and 8, when the system is turned ON (e.g., an OS begins running), the processor 100 may receive a current device time from the storage device 300 (S610).

The processor 100 may then calculate a difference value between the device time and the memory system time and store the difference value in the volatile memory 200 (S620).

The processor 100 may at this point determine whether the memory system time has changed after storing the difference value in the volatile memory 200 (S630). If the processor 100 determines that the memory system time has changed (S630=Y), the difference value between the device time and the memory system time may be recalculated and updated in the volatile memory 200 (S640).

If a command to create or modify data is not received (S650=N) in a state where the difference value is updated in the volatile memory 200 in step S640, the processor 100 may continue to determine whether the memory system time has been changed or whether the data has been modified or created.

Then, upon receiving a command to create or modify data (S650=Y) in a state where the difference value is updated in the volatile memory 200 in step S640 or a state where the memory system time is not changed (S630=N) through step S630, the processor 100 may calculate the device time of the storage device using the difference value stored in the volatile memory 200 (S660).

As one example, the processor 100 may determine the memory system time when creating or modifying data, and calculate the device time of the storage device by subtracting or adding the difference value stored in the memory 314 at the determined system time.

When calculating the device time of the storage device when data is created or modified in step S660, the processor 100 may store the calculated device time as meta information (e.g., data creation time or data modification time) of the data (S670).

According to other embodiments of the inventive concept, the processor 100 may receive the device time from the storage device at the time of data creation or data modification, and store the received device time as meta information consistent with the data creation time or data modification time. This approach will be described in some additional detail with reference to FIG. 9.

Referring to FIG. 9, the processor 100 may receive the device time from the storage device 300 when data is modified or created (S710). The processor 100 may store the device time received in step S710 in the meta information as a data creation time or a data modification time (S720).

Referring now to FIGS. 1, 2, 3 and 9, the controller 312 may determine the time information of the plurality of blocks and the metadata of the deleted data in step S360 and then select a block to be permanently deleted (S370). When a block to be permanently deleted is selected in step S370, the controller 312 may perform a permanent deletion of the selected block (S380). This approach will be described in some additional detail with reference to FIGS. 10, 11, 12, 13 and 14.

FIG. 10 is a table listing as examples certain outcomes for a method of performing permanent deletion in a storage device according to embodiments of the inventive concept.

Referring to FIGS. 7 and 10, upon receiving a command to delete a file 500, the controller 312 may determine a data creation time 511 and a modification time 512 in the meta information 510. For example, upon receiving the permanently delete command of the data 520 included in the file 500, the controller 312 may determine the information that the creation time 511 of the data 520 is "100" and the modification time 511 of the data 520 is "300". That is, upon receiving the permanently delete command of the data 520, the controller 312 may determine the initial data write time and the final data write time for each of the plurality of blocks in the block management area 321.

Here, the controller 312 may select, as block(s) to be permanently deleted, a block in which the initial data write time or the final data write time exists between the creation time 511 and the modification time 512 for the data 520, as well as a block including the creation time 511 for the data 520 or the modification time 512 for the data 520 between the initial data write time and the final data write time.

In the context of the illustrated embodiments of FIGS. 7 and 10, since "100" which is the creation time 511 for the data 520 is included between "100" which is the initial data write time of the first block 400 and "200" which is the final data write time of the first block 400, the controller 312 may select the first block 400 as a block to be permanently deleted. Further, since "100" which is the initial data write time of the first block 400 and "200" which is the final data write time of the first block 400 exist between "100" which is the creation time 511 and "300" which is the modification time 512 for the data 520, the controller 312 may select the first block 400 as a block to be permanently deleted.

Since "100" which is the creation time 511 and "300" which is the modification time 512 for the data 520 are included between "90" which is the initial data write time and "400" which is the final data write time of a second block 410, the controller 312 may select the second block 410 as a block to be permanently deleted.

Since "20" which is the initial data write time and "30" which is the final data write time of a third block 420 exist before "100" which is the creation time 511 and "300" which is the modification time 512 of the data 520 (see FIG. 7), the controller 312 may not select the third block 420 as a block to be permanently deleted.

Since "400" which is the initial data write time and "500" which is the final data write time of a fourth block 430 exist after "100" which is the creation time 511 and "300" which is the modification time 512 for the data 520, the controller 312 may not select the fourth block 430 as a block to be permanently deleted.

Since "110" which is the initial data write time and "130" which is the final data write time of a fifth block 440 exist between "100" which is the creation time 511 and "300" which is the modification time 512 of the data 520, the controller 312 may select the fifth block 440 as a block to be permanently deleted.

Since "200" which is the initial data write time of a sixth block 450 exists between "100" which is the creation time 511 and "300" which is the modification time 512 of the data 520, the controller 312 may select the sixth block 450 as a block to be permanently deleted. Further, since "300" which is the modification time 512 for the data is included between "200" which is the initial data write time and "500" which is the final data write time of the sixth block 450, the controller 312 may select the sixth block 450 as a block to be permanently deleted.

As a result in the foregoing example, the controller 312 may select the first block 400, the second block 410, the fifth block 440 and/or the sixth block 450 as blocks to be permanently deleted, and may not select the third block 420 and the fourth block 430 as blocks to be permanently deleted.

FIGS. 11, 12, 13 and 14 are conceptual diagrams respectively illustrating examples of a method of performing permanent deletion in a storage device according to embodiments of the inventive concept.

Referring to FIG. 11, the second page 402 and the third page 403 included in the first block 400 are pages invalidated by changing the first data A, and the third page 423 included in the third block 420 may be a page invalidated by changing or deleting the data different from the first data A.

When receiving a command to permanently delete the first data A, the controller 312 should first delete the first data A from the first page 411 in the second block 410. Further, since the controller 312 cannot determine what data is included in an invalidated page, in order to permanently delete the first data A, the third block 420 not including the first data A as well as the first block 400 and the second block 410 including the first data A must also be permanently deleted. In this case, since the number of blocks to be permanently deleted increases, a problem arises in that may take a relatively long time to complete these operations.

However, according to certain embodiments, the controller 312 may limit the number of blocks to be permanently deleted. For example, when receiving a command to permanently delete the first data A, the controller 312 may determine that the creation time 511 of the first data A is "100" and the modification time 512 is "300" in the meta information 510 of the first data A.

Further, referring to FIG. 12, when receiving a command to permanently delete the first data A, the controller 312 may determine the initial data write time and the final data write time for each of the plurality of blocks in the block management area 321.

The controller 312 may select the first block 400 and the second block 410 including the final data write time between "100" which is the creation time 511 of the first data A and "300" which is the modification time 512 of the first data A as blocks to be permanently deleted. Further, the controller 312 may not select the third block 420 having the initial data write time and the final data write time before the creation time 511 and the modification time 512 of the first data A as a block to be permanently deleted.

When a block to be deleted is selected by the above-described method, a block including a page including data that is not to be permanently deleted may be excluded, and the number of blocks to be permanently deleted can be reduced, thereby reducing the time for performing permanent deletion.

However, referring again to FIG. 11, the fourth data D different from the first data A to be deleted may be included in the block to be permanently deleted. In this case, the controller 312 must write the fourth data D to another block which is not selected as a block to be permanently deleted.

For example, when the first block 400 selected as a block to be permanently deleted includes the fourth data D different from the first data A to be deleted, the controller 312 may write the fourth data D to the unselected third block 420.

When writing the fourth data D included in the first block 400 to the third block 420, the controller 312 may determine the initial data write time and the final data write time of the first block 400 in which the fourth data D is stored. The controller 312 may update the initial data write time and the final data write time of the third block 420 by comparing the initial data write time and the final data write time of the first block 400 with the initial data write time and the final data write time of the third block 420.

Specifically, the controller 312 may change the initial data write time of the third block 420 to the initial data write time of the first block 400 only when the initial data write time of the first block 400 in which the fourth data D is stored is earlier than the final data write time of the third block 420 to which the data D is to be moved and written. Further, the controller 312 may change the final data write time of the third block 420 to the final data write time of the first block 400 only when the final data write time of the first block 400 is later than the final data write time of the third block 420.

Figure 14:
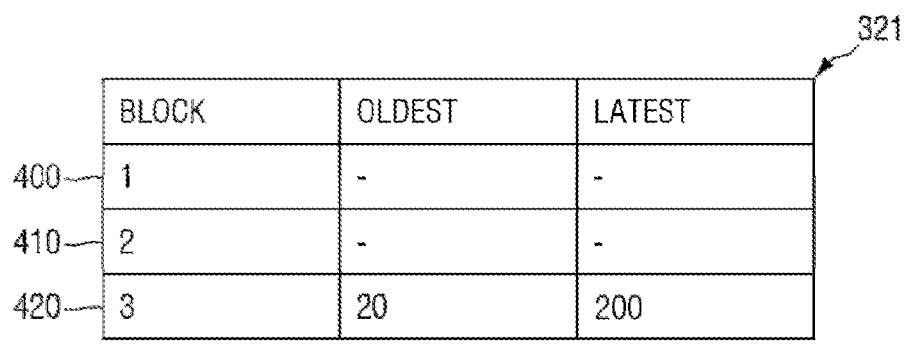

For example, referring to FIG. 12, the controller 312 may determine that the initial data write time of the first block 400 storing the fourth data D is 40 and the initial data write time of the third block 420 to which the fourth data D is to be moved and written is 20. In this case, since the initial data write time of the first block 400 is later than the initial data write time of the third block 420, the controller 312 can maintain as it is the initial data write time of the third block 420 as shown in FIG. 14.

Further, the controller 312 may determine that the final data write time of the first block 400 storing the fourth data is "200" and the final data write time of the third block 420 to which the fourth data D is to be moved and written is "30". In this case, since the final data write time of the first block 400 is later than the final data write time of the third block 420, the controller 312 may update the final data write time of the third block 420 to 200 which is the final data write time of the first block 400 as shown in FIG. 14.

Meanwhile, when the initial data write time and the final data write time of the third block 420 are not stored in the block management area 321 because the entire page of the third block 420 to which the fourth data D is to be moved and written is empty (e.g., in a free state), the controller 312 may update the initial data write time and the final data write time of the third block 420 to the initial data write time and the final data write time of the first block 400.

Although not shown in the drawings, the initial data write time and the final data write time of blocks may be updated in the same way even when garbage collection is performed.

Referring now to FIGS. 2 and 13, the controller 312 may perform permanent deletion of the first block 400 and the second block 410, which are blocks to be permanently deleted. That is, the controller 312 may empty them such that all the pages included in the first block 400 and the second block 410 are in a free state.

Further, referring again to FIGS. 2 and 14, the controller 312 may delete the initial data write time and the final data write time for the first block 400 and the second block 410 on which permanent deletion has been performed from the block management area 321. Thus, the initial data write time and the final data write time for the first block 400 and the second block 410 can be initialized.

When permanent deletion is performed by selecting a block to be permanently deleted as in the above-described embodiment, the data deleted on software can also be quickly deleted permanently on hardware.

Although some embodiments of the present inventive concept have been disclosed for illustrative purposes, those skilled in the art will appreciate that various modifications, additions and substitutions are possible, without departing from the scope and spirit of the inventive concept as disclosed in the accompanying claims.

What is claimed is:

1. A storage device comprising:
   a non-volatile memory including a first block, a second block and a block management area,
      wherein the block management area stores a first initial data write time and a first final data write time for the first block, and a second initial data write time and a second final data write time for the second block; and
   a memory controller that determines a creation time and a modification time for first data in response to a permanently delete command identifying the first data, selects at least one of the first block and the second block to be permanently deleted by comparing the first and second initial data write times and the first and second final data write times with the creation time and the modification time, and permanently deletes the selected at least one of the first block and the second block.

2. The storage device of claim 1, wherein the memory controller determines the creation time and the modification time of the first data by determining meta information for the first data.

3. The storage device of claim 1, further comprising a device timer configured to generate a device time associated with the storage device.

4. The storage device of claim 3, wherein the creation time, the modification time, the first and second initial data write times and the first and second final data write times are stored according to the device time.

5. The storage device of claim 1, wherein the memory controller updates at least one of the first initial data write time and the first final data write time of the first block upon receiving a command to write data to the first block or upon writing data to the first block in response to the command to write data.

6. The storage device of claim 1, wherein the block management area is a third block different from the first block and the second block included in the non-volatile memory.

7. The storage device of claim 1, wherein the memory controller selects the first block as a block to be permanently deleted when the creation time or the modification time is included between the first initial data write time of the first block and the first final data write time of the first block.

8. The storage device of claim 1, wherein the memory controller selects the first block as a block to be permanently deleted when the first initial data write time of the first block or the first final data write time of the first block is included between the creation time and the modification time.

9. The storage device of claim 1, wherein the memory controller does not select the second block as a block to be permanently deleted when the second initial data write time and the second final data write time of the second block are before the creation time.

10. The storage device of claim 1, wherein the memory controller does not select the second block as a block to be permanently deleted when the second initial data write time and the second final data write time of the second block are after the modification time.

11. A storage device comprising:

a non-volatile memory including a plurality of blocks, the plurality of blocks including a first block and a block including a block management area that stores an initial data write time and a final data write time for each one of the plurality of blocks; and a controller, wherein the controller updates at least one of a first initial data write time and a first final data write time for the first block stored in the block management area upon receiving a command to write data to a page of the first block or upon writing the data to the page of the first block in response to the command, determines a creation time and a modification time for first data in response to a permanently delete command identifying the first data, and selects blocks from among the plurality of blocks to be permanently deleted by comparing the initial data write time and the final data write time for each of the plurality of blocks with the creation time and the modification time.

12. The storage device of claim 11, wherein the controller selects, as the blocks to be permanently deleted, a block having an initial data write time or a final data write time that exists between the creation time and the modification time, and another block having an initial data write time and a final data write time wherein the creation time or the modification time exists between the initial data write time and the final data write time of the another block.

13. The storage device of claim 11, wherein the controller does not select, as one of the blocks to be permanently deleted, a block having an initial data write time and a final data write time before the creation time.

14. The storage device of claim 11, wherein the controller does not select, as one of the blocks to be permanently deleted, a block having an initial data write time and a final data write time after the modification time.

15. A memory system comprising:

a storage device including a controller and a device timer that generates device time associated with the storage device;

a processor including a system timer that generates memory system time associated with the memory system; and a volatile memory that stores a difference value between the device time and the memory system time, wherein the processor receives the device time from the device timer when the memory system is turned ON or the memory system time is changed, calculates a difference value between the memory system time and the device time, stores the difference value in the volatile memory, calculates a current device time based on the difference value when creating or modifying first data, and stores the current device time as a creation time or a modification time of the first data in meta information of the first data, and wherein the storage device further includes a non-volatile memory including a plurality of blocks and a block management area storing an initial data write time and a final data write time for each one of the plurality of blocks, and the controller determines the creation time and the modification time of the first data in response to a permanently delete command identifying the first data, and selects blocks from among the plurality of blocks to be permanently deleted by comparing the initial data write time and the final data write time for each of the plurality of blocks with the creation time and the modification time.

16. The memory system of claim 15, wherein the controller selects, as the blocks to be permanently deleted, a block having an initial data write time or a final data write time that exists between the creation time and the modification time, and another block having an initial data write time and a final data write time wherein the creation time or the modification time exists between the initial data write time and the final data write time of the another block.

17. The storage device of claim 15, wherein the controller does not select, as one of the blocks to be permanently deleted, a block having an initial data write time and a final data write time before the creation time.

18. The storage device of claim 15, wherein the controller does not select, as one of the blocks to be permanently deleted, a block having an initial data write time and a final data write time after the modification time.

* * * * *